INVENTOR
YASUO FUJII

BY Wenderoth, Lind & Ponack
ATTORNEYS

Jan. 20, 1970 YASUO FUJII 3,490,304

REVERSIBLE DRIVING MEANS FOR AUTOMATIC TUNING MEANS

Filed March 11, 1968 3 Sheets-Sheet 2

INVENTOR
YASUO FUJII

BY Wenderoth, Lind & Ponack

ATTORNEYS

Jan. 20, 1970 YASUO FUJII 3,490,304

REVERSIBLE DRIVING MEANS FOR AUTOMATIC TUNING MEANS

Filed March 11, 1968 3 Sheets-Sheet 3

INVENTOR
YASUO FUJII

BY Wenderoth, Lind & Ponack
ATTORNEYS 3,490,304
REVERSIBLE DRIVING MEANS FOR AUTOMATIC TUNING MEANS Yasuo Fujii, Osaka, Japan, assignor to Matsushita Electric Industrial Co., Ltd., Osaka, Japan Filed Mar. 11, 1968, Ser. No. 712,064
Int. Cl. F16h 3/14
U.S. Cl. 74—355 8 Claims

ABSTRACT OF THE DISCLOSURE

A device for driving the movable part of a tuning means of an automatic tuning device for a radio receiver. The device has a first gear which is rotatable in one direction around an axis of rotation and is driven by a driving means, and a second gear means rotatable about an axis of rotation parallel to the plane in which said first gear rotates and which is movable along its axis of rotation so as to mesh with said first gear at one side or the opposite side of said first gear. The device also includes a shifting means which rotates in two rotational directions opposite to each other and moves said second gear means reciprocally, and a third gear which is connected to said movable part of said tuning means and is rotatable in two directions and is driven by said second gear means. Said shifting means changes the direction of rotation of said third gear from one direction to the other of said two directions in response to the meshing of said second gear means with said first gear at one side or the opposite side of said first gear.

This invention relates to tuning means for a radio receiving apparatus, and more particularly to automatic tuning means commonly known as a "search tuner" or signal seeking tuning means."

Automatic tuning means generally comprise a driving means for moving a movable part of a tuning component, such as a variable capacitor, and a controlling device for stopping movement of the movable part of the tuning component upon receipt of an incoming signal of sufficient strength. The direction of movement of the movable part of the tuning component corresponds to the direction of scanning of a receiver over a predetermined band of signals.

It is necessary, in order to obtain the desired scanning action, that the movable part of the tuning component be movable in both directions. Further, it is necessary that when the movable part of the tuning component has reached one extremity of its range of movement, its direction of movement be reversed automatically. Automatic tuning means currently used in the market are equipped with a reversible electric motor which serves as the driving element of the driving means and with a reversible electrc motor which controls the direction of movement of the movable part of the tuning component. But an electric motor not only makes up a relatively large portion of the total cost of the tuning apparatus, but also needs electric energy to operate it.

On the other hand, a spring motor such as is conventionally employed as a driving element for a clock or a toy needs no electric energy and is less expensive than an electric motor. It would be desirable to be able to use such a spring motor for a driving element for the automatic tuning means of a portable radio receiver in order to save electric energy. However, the conventional spring motor is not movable in both direction.

Therefore, the principal object of this invention is to provide a driving means for automatic tuning means for a radio receiver, which employs, as a driving element, a spring motor capable of moving a moving part of a tuning component in any scanning direction.

Another object of this invention is to provide a driving means employing, as a driving element, a spring motor capable of automatcally changing the direction of movement of a movable part of a tuning component when said movable part of the tuning component has reached one extremity of its range of scanning movement.

These objects are achieved by the provision of a device for driving the movable part of a tuning means of an automatic tuning device for a radio receiver. The device has a first gear which is rotatable in one direction around an axis of rotation and is driven by a driving means, and a second gear means rotatable about an axis of rotation parallel to the plane in which said first gear rotates and which is movable along its axis of rotation so as to mesh with said first gear at one side or the opposite side of said first gear. The device also includes a shifting means which rotates in two rotational directions opposite to each other and moves said second gear means reciprocally, and a third gear which is connected to said movable part of said tuning means and is rotatable in two directions and is driven by said second gear means. Said shifting means changes the direction of rotation of said third gear from one direction to the other of said two directions in response to the meshing of said second gear means with said first gear at one side or the opposite side of said first gear.

Other and further objects of this invention will be apparent from the following detailed description taken together with the accompanying drawings, wherein.

Figure 1:
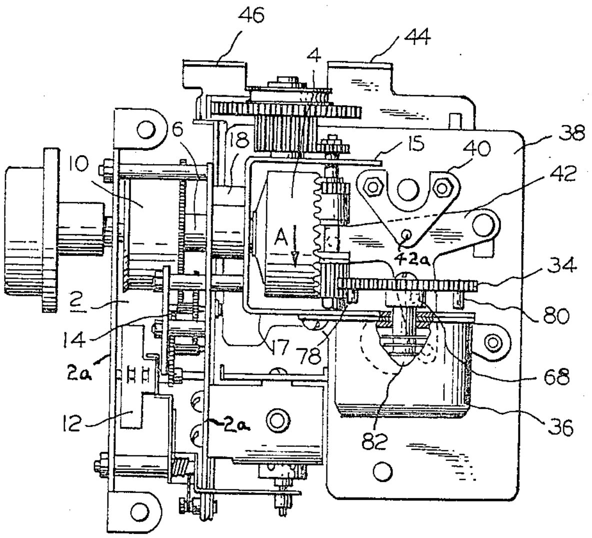
FIG. 1 is a front elevation view of a driving means for an automatic tuning means according to this invention.
Figure 3:
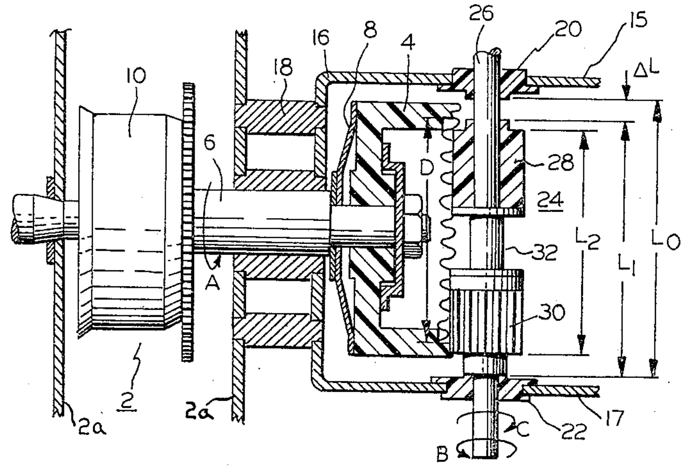
FIG. 3 is a partial enlarged sectional view of a part of the driving means of FIG. 1.

Referring to FIGS. 1 and 3, a first gear 4, which is a crown gear, is rotatably mounted on an output shaft 6 of a spring motor 2, which functions as a driving means, and is driven in the direction of arrow A by frictional engagement between a spring 8 mounted on said output shaft 6 and the gear 4. Said spring motor 2 has a well known construction and therefore is not shown in detail. It comprises a main spring (not shown) which is contained in a spring container 10 and which exerts a rotational torque upon said spring container 10 about its axis of rotation. The rotation speed of said spring container 10 is properly controlled or braked by an air vane governor 12 which is coupled through a gear train 14 to said spring container 10. The container 10, governor 12 and gear train 14 are mounted between spaced plates 2*a* which act as the supporting framework for the motor 2.

A U-shaped bracket 16 is secured to one of the plates 2*a* of said spring motor 2 by several studs 18. The respective upper leg 15 and lower leg 17 of said U-shaped bracket 16 have an upper bearing 20 and a lower bearing 22 secured thereto, respectively, for slidably supporting a shaft on which is fixed mounted a second gear means 24 which can mesh with said first gear 4. The axis of rotation of said second gear 24 is parallel to the plane of rotation of said first gear 4 as shown in FIGS. 1 and 3. Said second gear means 24 comprises an upper spur gear 28 and a lower spur gear 30, each fixed on said shaft 26.

The full distance $L_1$ from one end of said upper gear 28 to the other end of lower gear 30 is shorter by a distance $\Delta L$ than the distance $L_0$ between said upper bearing 20 and lower bearing 22 so that said second gear means 24 is able to move up and down a distance of $\Delta L$ between said upper bearing 20 and lower bearing 22. Between said upper gear 28 and lower gear 30, there is a neck portion 32 in which is engaged one end of a shift lever 42 described below. Further, the distance $L_2$ (shown in FIG. 3) between one end of the teeth on said upper gear 28 and the other end of the teeth on the lower gear 30 is slightly less than the internal diameter D of said first crown gear 4 so that said upper gear 28 and lower gear 30 do not come into meshing engagement with said first gear 4 at the same time.

Figure 4:
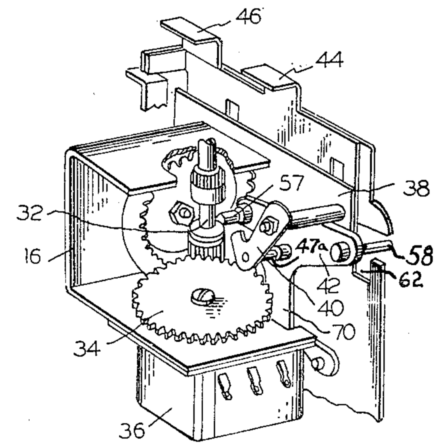
FIG. 4 is a partial perspective view, taken from above, of the driving means of FIG. 1 with the spring motor removed to better show the parts.

When said second gear 24 has been shifted downwardly along the axis of said shaft 26, a meshing engagement between said first gear 4 and said lower gear 30 is established so that said second gear means 24 rotates in the direction of arrow B. However, when said second gear 24 has been shifted upwardly, a meshing engagement between said first gear 4 and said upper gear 28 is established so that said second gear means rotates in the direction of arrow C opposite to that of the arrow B, because said first gear 4 rotates always in the direction of arrow A. As shown in FIGS. 1 and 4, said lower gear 30 always meshes with a third gear 34 which is secured to a movable part 82 of a tuning component 36. Accordingly the rotational direction of said movable part 82 is reversed by a change from a meshing engagement between said first gear 4 and said lower gear 30 to a meshing engagement between said first gear 4 and said upper gear 28 and vice versa.

Figure 7:
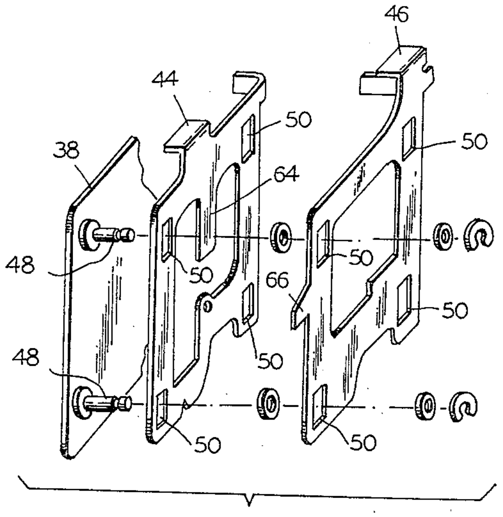
FIG. 7 is an exploded view of two push buttons for the driving means of FIG. 1.

A shifting means for shifting said second gear means 24 upwardly or downwardly is shown in FIGS. 1, 4 and 7. A side panel 38 is secured to said U-shaped bracket 16 and has a sub-panel 40 spaced inwardly, i.e. toward shaft 26, from side panel 38 and secured to side panel 38. Between said side panel 38 and sub-panel 40 is the T-shaped shifting lever 42 which forms the shifting means and which is supported on a shaft 42*a* extending between bearings on said panel 38 and sub-panel 40. Two push buttons, i.e. left push button 44 and right push button 46, are slidably mounted on the outer side of said side panel 38 on four pins 48 which are fixed to said side panel 38 and which are positioned in four slots 50 formed in said push buttons 44 and 46, respectively, so that up and down movement of said push buttons 44 and 46 is limited by said slots 50. Said two push buttons 44 and 46 are biased upwardly by springs 52 and 54 (shown in FIG. 2).

As shown in FIGS. 2, 4, 5 and 7, two pins, i.e. a left pin 56 and a right pin 58 are fixed to said T-shaped shifting lever 42 and extend through openings 60 and 62 so as to be engaged by a projecting portion 64 on said left push button 44 and a projecting portion 66 on said right push button 46, respectively. A pin 57 on the other side of lever 42 engages with said neck portion 32 of the second gear means 24 and shifts the second gear 24 upwardly and downwardly when lever 42 moves.

The operation of the novel driving means will now be clearly explained.

Figure 2:
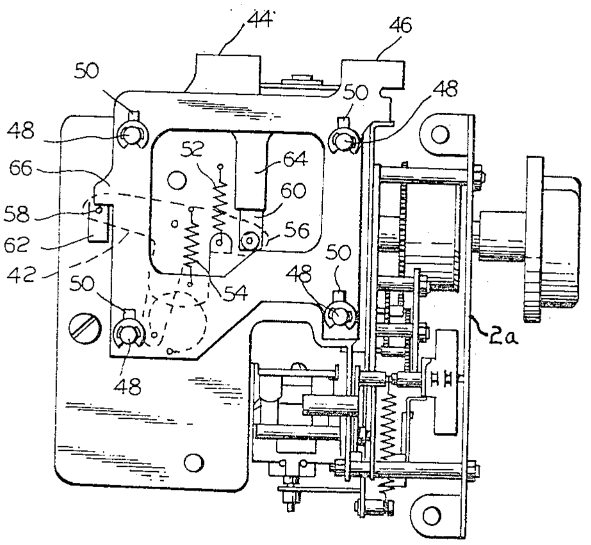
FIG. 2 is a rear elevational view of the driving means of FIG. 1.

When an operator pushes said left push button 44 down, said left pin 56 is also pushed down due to the engagement there of said projecting portion 64 so that said T-shaped shifting lever 42 rotates clockwise in FIG. 2. As a result, said second gear means 24 is shifted downwardly by the engagement between said pin 57 and said neck portion 32 of said second gear means 24, and said lower gear 30 meshes with said first gear 4. On the contrary, when an operator pushes said righ push button 46 down, said right pin 58 is also pushed down by the engagement therewith of said projecting portion 66, so that said T-shaped shifting lever 42 rotates counterclockwise, with the result that said second gear means 24 shifts upwardly and said upper gear 28 meshes with said first gear 4. Thus, the direction of rotation of said movable part 82 of said tuning component 36 is changed by pushing down said left push button 44 or said right push button 46.

The invention also includes automatic reversing means which automatically reverse the direction of rotation of the movable part of tuning component when it reaches one extremity of its range of rotation.

Figure 5:
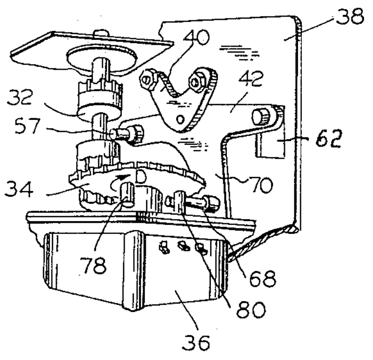
FIG. 5 is a perspective view, taken from below, of the driving means of FIG. 4.
Figure 6:
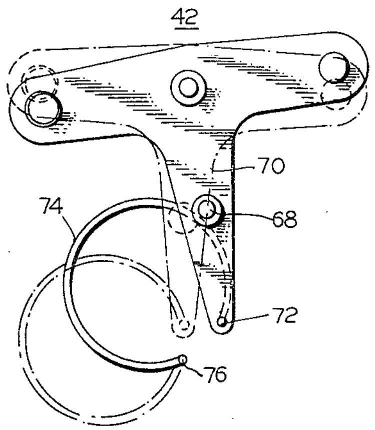
FIG. 6 is an enlarged elevation view of a shifting lever attached to a side panel of the driving means.

Referring to FIGS. 5 and 6, a central leg 70 is provided on said T-shaped shifting lever 42 and a detecting pin 68 is mounted thereon to serve as a detecting means and a spring receiving hole 72 is provided therein. A C-shaped spring 74 is anchored between said spring hole 72 and another spring hole 76 which is formed in said side panel 38. Said C-shaped spring 74 imparts a torque to said shifting lever 42 to rotate it counterclockwise when it is in the position shown in full lines in FIG. 6. When said shifting lever 42 occupies a position shown in dotted lines in FIG. 6, said C-shaped spring 74 exerts no torque. However, when said shifting lever 42 is moved either in the clockwise direction or the counterclockwise direction from the dotted line position of FIG. 6, said C-shaped spring 74 exerts torque in the direction of movement of said shifting lever 42. As shown in FIGS. 1 and 5, two limiting pins, i.e. a left limiting pin 78 and a right limiting pin 80, are mounted on the bottom face of third gear 34. As seen in FIGS. 1 and 5, said third gear 34 continues to rotate in the direction of arrow D until said right limiting pin 80 collides with said detecting pin 68 and rotates said shifting lever 42 clockwise in FIGS. 1 and 5. As previously mentioned, said shifting lever 42 is biased in the counterclockwise direction by said C-shaped spring 74. Therefore, said third gear 34 continues to rotate said shifting lever 42 against the bias of spring 74.

As soon as said shifting lever 42 is moved slightly past the dead center position by said third gear 34, said shifting lever 42 is rotated clockwise by the torque of said C-shaped spring 74. This clockwise rotation of said shifting lever 42 shifts said second gear means 24 upwardly so that said upper gear 28 meshes with said first gear 4. Therefore, the direction of rotation of said third gear 34, and with it the direction of rotation of the movable part 82 of tuning component 36, is reversed automatically to a direction opposite to that of arrow D. The third gear 34 continues to rotate in a direction opposite to that of arrow D until said left limiting pin 78 collides with said detecting pin 68 and rotates said shifting lever 42 counterclockwise so that said second gear means 24 shifts downwardly. Therefore, the direction of rotation of said third gear 34 and of movable part 82 of the tuning component again change automatically to the direction of arrow D.

In a device according to this invention, said shifting lever 42 can be operated manually by engaging either of the aforesaid two push buttons 44 and 46 with said left pin 56 or said right pin 58, respectively, or automatically by the engagement of said detecting pin 68 with said limiting pin 80.

The output torque of the spring motor 2 necessary for automatically moving said second gear means 24 up and down increases with an increase in the coefficient of friction between second gear shaft 26 and upper bearing 20 or lower bearing 22. As a practical matter, a coefficient of friction higher than 0.25 prevents the automatic movement of said second gear 24. It has been discovered according to the invention that a coefficient of friction less than 0.25 is operable, preferably less than 0.10 for the device according to the invention. Therefore it is necessary that said upper bearing 20 and said lower bearing 22 be made of a frictionless material such as polyacetal resin, fluoro-carbon resin, polyamide resin, polyolefine resin or carbon graphite.

The coefficient of friction referred to herein is defined by the following equation:

$$\mu=A/B$$

where $\mu$ is a coefficient of friction, A is a kinetic frictional force, and B is a normal force transmitted by the surface of contact. These forces, A and B, are measured by an apparatus described on page 84 of Text Book "The Friction and Lubrication of Solids" by F. P. Bowden et al. (Oxford at the Clarendon Press 1958).

It is apparent that various modifications can be made without departing from the spirit or scope of the present invention. The above described examples are intended merely to illustrate some of the important facets in certain selected embodiments of the present invention.

What is claimed is:

1. A device for driving a movable part of a tuning means of an automatic tuning device for a radio receiver, said driving device comprising a first gear rotatable in one direction about an axis of rotation and adapted to be driven by a driving element; a second gear means having a rotational axis parallel to a plane of rotation of said first gear and being movable along its own rotational axis to mesh with said first gear at either of the two opposite sides of said first gear; a shifting means coupled with said second gear means and movable between two positions and reciprocally moving said second gear means; a third gear adapted to be coupled to said movable part of said tuning means and engaged by said second gear means for rotation in opposite directions; said shifting means bringing about a change in the direction of rotation of said third gear from one direction to the opposite direction by changing the meshing engagement of said second gear means with said first gear from one side to the opposite side of said first gear; a detecting means provided on said shifting means; and limiting means on said third gear which engages said detecting means and moves said shifting means at the extremities of the range of rotation of said movable part.

2. A driving device as claimed in claim 1 which further comprises two push buttons, one of which engages and moves said shifting means to one position of said two positions and the other of which engages and moves said shifting means to the other position, whereby said shifting means can be operated manually and automatically.

3. A driving device as claimed in claim 1 wherein, said shifting means is a T-shaped lever which is pivotally mounted for rotation in two rotational directions and has a first pin and a second pin engageable by the respective push buttons, and a central leg, said detecting means comprising a detecting pin mounted on said central leg and said limiting means on said third gear engaging said detecting pin at the extremities of the range of rotation of said movable part of said tuning means for shifting said lever.

4. A driving device as claimed in claim 3 which further comprises a spring means connected to said T-shaped lever which exerts a torque thereon urging said T-shaped lever away from a dead center position in either of said two rotational directions.

5. A device for driving a movable part of a tuning means of an automatic tuning device for a radio receiver, said driving device comprising a first gear rotatable in one direction about an axis of rotation and adapted to be driven by a driving element; a second gear means comprising two gears having a rotational axis parallel to a plane of rotation of said first gear and being movable along its own rotational axis to mesh with said first gear at either of the two opposite sides of said first gear; a shifting means coupled with said second gear means and movable between two positions and reciprocally moving said second gear means; a third gear adapted to be coupled to said movable part of said tuning means and engaged by one of said gears of said second gear means for rotation in opposite directions; said shifting means bringing about a change in the direction of rotation of said third gear from one direction to the opposite direction by changing the meshing engagement of said second gear means with said first gear from one side to the opposite side of said first gear; and bearing means in which said second gear means is rotatably mounted, said bearing means being a frictionless material having a coefficient of friction less than 0.15.

6. A driving device as claimed in claim 5 in which said frictionless material is a member selected from the group consisting of polyacetal resin, fluorocarbon resin, polyamide resin, polyolefine resin and carbon graphite.

7. A device for driving a movable part of a tuning means of an automatic tuning device for a radio receiver, said driving device comprising a first gear rotatable in one direction about an axis of rotation and adapted to be driven by a driving element; a second gear means comprising two gears and a shaft thereof, which has a rotational axis parallel to a plane of rotation of said first gear, and said second gear means being movable along said rotational axis to mesh with said first gear at either of the two opposite sides of said first gear; a shifting means coupled with said second gear means and movable between the positions and reciprocally moving said second gear means; and a third gear adapted to be coupled to said movable part of said tuning means and engaged by one of said gears of said second gear means for rotation in opposite directions; said shifting means bringing about a change in the direction of rotation of said third gear from one direction to the opposite direction by changing the meshing engagement of said second gear means with said first gear from one side to the opposite side of said first gear.

8. A driving device as claimed in claim 1 which further comprises two push buttons, one of which engages and moves said shifting means to one position on said two positions and the other of which engages and moves said shifting means to the other position.

References Cited

UNITED STATES PATENTS

| | | | |
|---|---|---|---|
| 1,285,408 | 11/1918 | Sargent | 74—355 |
| 1,296,629 | 3/1919 | Cornelison | 74—355 |
| 1,883,163 | 10/1932 | Van Voorhis | 74—10.8 X |
| 2,238,739 | 4/1941 | Jarvis | 74—10.8 X |

MILTON KAUFMAN, Primary Examiner

U.S. Cl. X.R.

74—10.8, 404